UNITED STATES PATENT OFFICE

Patented Mar. 2, 1954

2,671,088

REISSUED

July 22, 1958

Re. 24,505

2,671,088

ANTITHYROID COMPOUNDS

Claude Rimington, New Barnet, Alexander Lawson, Southgate, London, Charles Edmund Searle, Wandsworth Common, London, and Harold Victor Morley, Denmark Hill, London, England, assignors to National Research Development Corporation, London, England, a British corporation No Drawing. Application March 24, 1952, Serial No. 278,308

Claims priority, application Great Britain April 2, 1951

6 Claims. (Cl. 260—309)

This invention comprises new anti-thyroid compounds.

It is known that 1-methyl-2-mercaptoglyoxaline is a very potent anti-thyroid agent. Its activity is much greater than thiouracil, the drug in most common use.

The new compounds of the present invention have the formula:

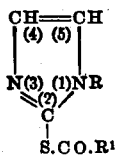

in which R is an alkyl, aryl or alkaryl group and $R^1$ is an alkoxy, alkylamino or aralkyloxy group, or mercaptoglyoxaline residue.

These compounds are no less potent than 1-methyl-2-mercaptoglyoxaline and have the advantage of being relatively tasteless and of having a more prolonged action. In these respects, the compounds hereinafter described in the examples are particularly valuable. They exhibit no evidence of toxicity.

The compounds may be produced from 2-mercaptoglyoxalines having a substituent group R on the 1-nitrogen atom, according to the following reaction.

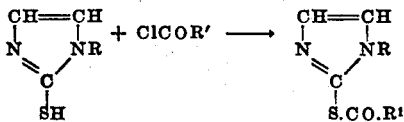

The R-substituted 2-mercaptoglyoxalines themselves are prepared by either of the two following methods which are already known.

(a) By the reaction of bromoacetal under pressure with an amine (e. g. methylamine, allylamine, benzylamine, aniline, or cinnamylamine) followed by ring closure with an alkali thiocyanate in acid solution, or (b) by the reaction in alcoholic solution of aminoacetal with an organic isothiocyanate (e. g. methylisothiocyanate, allylisothiocyanate, benzylisothiocyanate, or phenylisothiocyanate) followed, if necessary, by treatment of the so formed substituted thiourea with acid to effect ring closure.

The following examples are given in illustration:

Example 1.—Preparation of 1-methyl-2-carbethoxythioglyoxaline 0.1 mol. of 1-methyl-2-mercaptoglyoxaline is dissolved in the minimum quantity of pyridine at 0° C. 0.1 mol. of ethyl chloroformate is added dropwise with stirring. More pyridine is added, if necessary, to keep the mixture semi-fluid. The sludge is then placed in an ice-box for 30 minutes. The crystals are filtered off and washed firstly with a little ethanol and secondly with ethanol and water. The product is crystallised from the solvent to give colourless needles having a melting point of 122–3° C. Found: C, 45.7; H, 5.4. $C_7H_{10}O_2N_2S$ requires C, 45.2, H, 5.4%.

Example 2.—Preparation of 1-methyl-2-carbomethoxythioglyoxaline

The procedure of Example 1 is followed but substituting methyl chloroformate for the ethyl ester. The product, recrystallised from ethanol, has a melting point of 135° C. Found: C, 41.7; H, 4.4. $C_6H_8O_2N_2S$ requires C, 41.8; H, 4.6%.

Example 3.—Preparation of 1-methyl-2-carbobenzoxythioglyoxaline (a) 0.1 mol of 1-methyl-2-mercaptoglyoxaline is dissolved in the minimum amount of pyridine at 0° C. 0.1 mol of carbobenzoxy chloride is added dropwise with stirring. The solution is then stirred for ½–1 hour at room-temperature and placed in a vacuum desiccator over concentrated $H_2SO_4$/KOH.

The sticky oil is rubbed under petroleum-ether and the solvent poured off. This is repeated twice. The thick oil is then rubbed under water which causes it to crystallise slowly. The white crystalline material is filtered off. On recrystallisation from benzene/petroleum-ether (60–80° C.) the product is obtained in white needles having a melting point of 91–92° C. (b) 0.1 mol of 1-methyl-2-mercaptoglyoxaline is dissolved in 50 ml. of 4 N-caustic soda at 0° C. 0.1 mol. of carbobenzoxy chloride is added slowly. After the addition, the mixture is stirred at 0° C. for 15–30 minutes. The reaction mixture is then placed in an ice-box for ½ hour, the white solid filtered off and washed firstly with water and secondly with petroleum-ether. The solid is crystallised from benzene/petroleum-ether to give white needles having a melting point of 91–92° C. Found: C, 58.3; H, 4.9. $C_{12}H_{12}O_2N_2S$ requires C, 58.1; H, 4.9%.

Example 4.—Preparation of 1-methyl-2-hippurylthioglyoxaline 0.01 mol. of 1-methyl-2-mercaptoglyoxaline is dissolved in 10 ml. β-picoline at room temperature and 0.01 mol. 2-phenyloxazol-5-one added slowly. The mixture is allowed to stand at room temperature for 24 hrs., and then is poured into ice water with stirring. The small crystals appearing are then removed by filtration and recrystallised several times from ethyl acetate in which they are rather sparingly soluble. This gives a colourless microcrystalline product, M. P. 175° C. Found C, 56.4; H, 4.9; N, 15.3%. $C_{13}H_{13}O_2N_3S$ requires C, 56.9; H, 4.7; N, 15.3%.

*Example 5.—Preparation of di-(1-methyl-2-glyoxalinyl) dithiolcarbonate dihydrochloride*

0.01 mol. of 1-methyl-2-mercaptoglyoxaline is dissolved in 30 ml. dry benzene and 0.01 mol. phosgene dissolved in toluene is added slowly with cooling. The reddish coloured precipitate is filtered off and recrystallised from alcohol containing a small amount of water. Colourless needles M. P. 167° C. Found: C, 32.3; H, 4.1%. $C_9H_{12}ON_4S_2Cl_2.H_2O$ requires C, 31.4; H, 4.07%.

We claim:

1. As a new anti-thyroid compound, a substance selected from the group consisting of 1-methyl-2-carbethoxythioglyoxaline, 1-methyl-2-carbomethoxythioglyoxaline, 1-methyl-2-carbobenzoxythioglyoxaline, 1-methyl-2-hippurylthioglyoxaline and di-(1-methyl-2-glyoxalinyl) dithiolcarbonate dihydrochloride.

2. As a new anti-thyroid compound, the substance 1-methyl-2-carbethoxythioglyoxaline.

3. As a new anti-thyroid compound, the substance 1-methyl-2-carbomethoxythioglyoxaline.

4. As a new anti-thyroid compound, the substance 1-methyl-2-carbobenzoxythioglyoxaline.

5. As a new anti-thyroid compound, the substance 1-methyl-2-hippurylthioglyoxaline.

6. As a new anti-thyroid compound, the substance di-(1-methyl-2-glyoxalinyl) dithiolcarbonate dihydrochloride.

CLAUDE RIMINGTON.
ALEXANDER LAWSON.
CHARLES EDMUND SEARLE.
HAROLD VICTOR MORLEY.

References Cited in the file of this patent

UNITED STATES PATENTS

| Number | Name | Date |
|---|---|---|
| 2,519,310 | Dessert | Aug. 15, 1950 |
| 2,585,388 | Jones | Feb. 12, 1952 |